Patented Sept. 18, 1951

2,568,591

UNITED STATES PATENT OFFICE 2,568,591

UTAH COAL RESIN MODIFIED ALKYD RESINS

Ernest D. Lee, Teaneck, and Rupert J. Schefbauer, Jr., Union City, N. J., assignors to Interchemical Corporation, New York, N. Y., a corporation of Ohio No Drawing. Application March 26, 1948, Serial No. 17,373

6 Claims. (Cl. 260—26)

This invention relates to the process of preparing new and useful resinous materials from the resins obtained from resin-bearing coals such as the coals that are found in Utah.

Certain coals, notably the bituminous coal in the Utah coal field obtained from between Castlegate on the north and Salina Canyon on the south, contain substantial percentages (up to 10%) of resinous material. In order to obtain the useful resin from such coals it is necessary to effect the separation of resin from the coal. One method of separating the resinous material is by froth flotation process to obtain a crude resin concentrate containing the resin and unseparated coal in an amount of 5 to 15% (e. g. U. S. Patent No. 1,773,997). The resin is then extracted from the remaining coal by a suitable solvent, e. g. commercial hexane or a petroleum ether. Several different solvent extraction procedures can be used and the properties of the particular solvent extracted resin will depend somewhat upon the particular solvent and method used for separating the resin.

It has now been discovered that the properties of solvent soluble resins obtained from resin-bearing coal by the processes referred to hereinabove can be improved by reacting the solvent extracted resins with an ethylenically unsaturated polycarboxylic acid or anhydride, such as the alpha, beta-unsaturated polycarboxylic acids, or with an alpha, beta-unsaturated acid or anhydride and a polyhydric alcohol such as a glycol, glycerol and pentaerythritol. The resins obtained by this treatment have higher melting points and their solutions have higher viscosities than the unmodified resins from which they are derived.

In the practice of the present invention it is preferred that the coal resin be reacted with the alpha, beta-ethylenically unsaturated polycarboxylic acid or anhydride in the ratio of 5 to 20 parts of resin to one part of the polybasic acid or anhydride, and then with one part of polyhydric alcohol. However, the two reactants may be reacted with the coal resin simultaneously. Hereinafter, in the description, where the term polycarboxylic acid alone is used it is to be understood that the polycarboxylic acid anhydrides which, if such anhydrides exist, are for the purposes of this invention equivalents of the acids and may be used instead of the acid. In certain instances the polycarboxylic acid anhydride will be preferred for the reason that the anhydride is more readily available than the acid, e. g. maleic anhydride is more readily available than maleic acid. Similarly, fumaric acid will be used instead of fumaric anhydride.

Among the ethylenically alpha, beta-unsaturated polycarboxylic acids and anhydrides that are operable in the present invention are maleic anhydride, fumaric acid, itaconic acid, citraconic acid and aconitic acid. Compounds which yield alpha, beta-unsaturated polycarboxylic acids under the reaction conditions of the invention, are also operable.

The polyhydric alcohols that are useful in the present invention include the glycols, e. g. ethylene glycol, propylene glycol, diethylene glycol, dipropylene glycol and the like, and other polyhydric alcohols such as glycerol, mannitol, erythritol, sorbitol and pentaerythritol. In general, polyhydric alcohols that are commonly used in making conventional types of alkyd resins are useful in the present invention.

In the practice of the invention it is preferred that the reactions be carried out at elevated temperatures of the order of 200 to 300° C. Necessarily the reaction time will vary depending upon the particular temperature used.

The following examples are typical of processes of the invention:

*Example I.*—To 100 g. of amber colored coal resin (melting point 160-164° C.) obtained by extracting resin concentrate from the froth flotation process with commercial hexane solvent, was added 12 g. of maleic anhydride and then the mixture was heated to 230 to 250° C. for one-half hour. Then 12 g. of glycerine was added and the temperature was maintained at 230° to 250° C. for another one-half hour. After cooling the reaction mass to room temperature a dark colored homogeneous solid was obtained. The capillary melting point of the solid resin was 187° to 190° C. as compared to 160° to 164° C. for the unmodified resin. The resin was soluble in aliphatic hydrocarbon solvents of type used in making heat drying inks to give solutions of high viscosity.

*Example II.*—By a procedure similar to Example I a resin was prepared from 100 g. of hexane extracted coal resin (melting point 160° to 164° C.), 12 g. of fumaric acid and 12 g. of glycerine. The resin had a melting point of 165° to 170° C.

*Example III.*—By the procedure of Example I a resin was prepared by reacting 100 g. of hexane extracted coal resin (melting point 160 to 164° C.) with 12 g. of itaconic acid and 12 g. of pentaerythritol. The resulting resin had a melting point of 180 to 185° C.

*Example IV.*—By the procedure of Example I a resin was prepared by reacting 100 g. of hexane extracted coal resin (melting point 160° to 164° C.) with 12 g. of maleic anhydride and 12 g. of ethylene glycol. The melting point of this resin was 185 to 190° C.

Numerous other resins were prepared by procedures similar to that of Example I. The table lists several of these resins to illustrate the effects of different amounts of unsaturated polycarboxylic acid and alcohol on the melting point of the resulting resins. For comparative purposes the resins were all made from the same type of solvent extracted coal resin, polycarboxylic acid and polyhydric alcohol.

*Table*

| Parts by weight of hexane extracted resin of M.P. 160–164° | Parts by weight of maleic anhydride | Parts by weight of glycerol | Capillary melting point of the resin in °C. |
|---|---|---|---|
| 100 | 6 | 6 | 173–176 |
| 100 | 12 | 12 | 186–190 |
| 100 | 15 | 15 | 176–183 |
| 100 | 20 | 20 | 180–185 |
| 100 | 12 | 6 | 164–171 |

In the examples listed hereinabove the coal resin used in each of them has been the resin obtained by extracting the flotation concentrate with commercial hexane. It should be understood that although this particular resin is preferred, chiefly because of the economy in obtaining it, other solvent extracted coal resins are operable in the present invention. For instance, it is possible to obtain relatively high melting resins from Utah coal by extracting the flotation concentrate with special solvents such as 2-methyl pentane according to our copending application Serial No. 746,857, filed May 8, 1947. The use of these higher melting resins in the process of the present invention would of course result in correspondingly higher melting products than where the hexane extracted resin is employed.

Also, if lighter colored resin is desired, the hexane solution of coal resin may first be decolorized by filtration through fuller's earth or activated heat treated clay; for example, according to the process disclosed in E. D. Lee United States Patent 2,309,216, issued October 15, 1946.

The modified coal resin products obtained by the process of the present invention are useful in many types of inks, coatings and the like. They are especially useful in typographic and lithographic printing inks of the solvent-resin type characterized particularly by extremely rapid drying by application of heat.

Having described our invention and the manner in which it can be practiced, we claim as our invention:

1. In a process of recovering resins from resin-bearing coals of the Utah type wherein the crude resin is separated from the bulk of the coal to produce a resin concentrate of resin admixed with coal and the soluble resin is then extracted from the resin concentrate with a hydrocarbon solvent, the steps comprising reacting the solvent extracted resin with an alpha, beta-unsaturated polycarboxylic acid and a polyhydric alcohol at a temperature of 200° to 300° C.

2. In a process of recovering resins from resin-bearing coals of the Utah type wherein the crude resin is separated from the bulk of the coal to produce a resin concentrate of resin admixed with coal and the soluble resin is then extracted from the resin concentrate with a hydrocarbon solvent, the steps comprising reacting 100 parts of the solvent extracted resin with 5 to 20 parts of maleic anhydride and 5 to 20 parts of glycerol at a temperature of 200° to 300° C.

3. In a process of recovering resins from resin-bearing coals of the Utah type wherein the crude resin is separated from the bulk of the coal to produce a resin concentrate of resin admixed with coal and the soluble resin is then extracted from the resin concentrate with a hydrocarbon solvent, the step comprising reacting 100 parts of the solvent extracted resin with 5 to 20 parts of an alpha, beta-unsaturated polycarboxylic acid at a temperature of 200 to 300° C.

4. A resin having a melting point above 165° C. obtained by reacting 100 parts of a hydrocarbon solvent extracted Utah coal resin with 5 to 20 parts of an alpha, beta-unsaturated polycarboxylic acid and 5 to 20 parts of a polyhydric alcohol at 200° to 300° C.

5. As a new resinous material, the reaction product of 100 parts of hydrocarbon solvent extracted Utah coal resin with 5 to 20 parts of an alpha, beta-unsaturated polycarboxylic acid at 200° to 300° C.

6. As a new resinous material, the reaction product of 100 parts of hydrocarbon solvent extracted Utah coal resin with 5 to 20 parts of maleic anhydride and 5 to 20 parts of glycerol at 200° to 300° C.

ERNEST D. LEE.
RUPERT J. SCHEFBAUER, Jr.

REFERENCES CITED

The following references are of record in the file of this patent:

UNITED STATES PATENTS

| Number | Name | Date |
|---|---|---|
| 2,039,243 | Krzikalla et al. | Apr. 28, 1936 |

OTHER REFERENCES

Lee, Interchemical Review, vol. 6, pages 91–102 (1947–8).

Certificate of Correction

Patent No. 2,568,591 September 18, 1951

ERNEST D. LEE ET AL.

It is hereby certified that error appears in the printed specification of the above numbered patent requiring correction as follows:

Column 3, line 51, for patent number "2,309,216" read *2,409,216*; and that the said Letters Patent should be read as corrected above, so that the same may conform to the record of the case in the Patent Office.

Signed and sealed this 11th day of December, A. D. 1951.

[SEAL]

THOMAS F. MURPHY,
*Assistant Commissioner of Patents.*